US008556330B2

(12) United States Patent

Lazarevich et al.

(10) Patent No.: US 8,556,330 B2

(45) Date of Patent: Oct. 15, 2013

(54) REMOVABLE DOOR WITH HINGE DETENT

(75) Inventors: Robert R. Lazarevich, Rochester, MI (US); Richard M. Kleinhoffer, Macomb Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/350,170

(22) Filed: Jan. 13, 2012

(65) Prior Publication Data

US 2013/0180177 A1 Jul. 18, 2013

(51) Int. Cl.
*B60J 5/00* (2006.01)

(52) U.S. Cl.
USPC ............ 296/146.11; 16/262; 16/284; 16/334; 16/381

(58) Field of Classification Search
USPC .......... 296/146.11, 146.12; 16/256, 262, 264, 16/284, 303, 334, 380, 381, 332
See application file for complete search history.

(56) References Cited

U.S. PATENT DOCUMENTS

| | | | | | |
|---|---|---|---|---|---|
| 769,035 | A | * | 8/1904 | Walter | 16/330 |
| 1,155,867 | A | * | 10/1915 | Allgier | 16/50 |
| 1,429,416 | A | * | 9/1922 | Fade | 16/330 |
| 1,440,713 | A | * | 1/1923 | Ausbourne | 16/324 |
| 1,465,912 | A | * | 8/1923 | Jensen | 16/330 |
| 2,097,651 | A | * | 11/1937 | Stangeland | 16/330 |
| 3,905,065 | A | * | 9/1975 | Seeger et al. | 16/317 |
| 3,975,794 | A | * | 8/1976 | Kaiser et al. | 16/303 |
| 4,030,161 | A | * | 6/1977 | Loikitz | 16/284 |
| 4,494,273 | A | * | 1/1985 | Straus | 16/50 |
| 4,715,090 | A | * | 12/1987 | Morris | 16/261 |
| 4,864,689 | A | | 9/1989 | Brockhaus | |
| 4,991,259 | A | * | 2/1991 | Finkelstein et al. | 16/312 |
| 5,104,161 | A | * | 4/1992 | Kautt | 292/157 |
| 5,516,073 | A | | 5/1996 | McMahan | |
| 5,682,646 | A | | 11/1997 | Tyler, IV et al. | |
| 5,924,170 | A | | 7/1999 | Papke et al. | |

(Continued)

FOREIGN PATENT DOCUMENTS

| | | | |
|---|---|---|---|
| DE | 19831085 | A1 | 4/1999 |
| EP | 1959076 | A1 | 8/2008 |
| GB | 517158 | | 1/1940 |
| GB | 2281099 | A | 2/1995 |

OTHER PUBLICATIONS

International Search Report dated Feb. 28, 2013 for International Application No. PCT/US2013/021110, International Filing Date Jan. 11, 2013.

(Continued)

*Primary Examiner* — Dennis Pedder
(74) *Attorney, Agent, or Firm* — Frederick A. Krieger

(57) ABSTRACT

A hinge assembly may include first and second hinge portions, a pivot pin, and a retaining member. The first hinge portion may be secured to one of a vehicle body and a door, and may include a first aperture and a protrusion. The second hinge portion may be secured to another of the vehicle body and the door, and may include a second aperture and a first detent. The protrusion may engage the first detent when the door is in an open position. The pivot pin may selectively engage the first and second apertures to provide relative rotation between the first and second hinge portions. The retaining member may engage a portion of the pivot pin and may be axially movable relative to one of the first and second apertures.

20 Claims, 4 Drawing Sheets

(56) References Cited

U.S. PATENT DOCUMENTS

| | | | | |
|---|---|---|---|---|
| 6,073,989 | A | 6/2000 | Hilliard et al. | |
| 6,568,032 | B1 * | 5/2003 | Ramsauer | 16/329 |
| 6,892,425 | B2 | 5/2005 | Smith | |
| 6,928,695 | B2 * | 8/2005 | Ochiai | 16/85 |
| 6,948,214 | B2 | 9/2005 | Spalding et al. | |
| 7,275,670 | B1 | 10/2007 | Shumack et al. | |
| 7,945,996 | B2 * | 5/2011 | Gunderson | 16/312 |
| 8,066,320 | B1 * | 11/2011 | Grabowski | 296/146.11 |
| 8,407,859 | B1 * | 4/2013 | Mitchell et al. | 16/312 |

OTHER PUBLICATIONS

Written Opinion dated Feb. 28, 2013 for International Application No. PCT/US2013/021110, International Filing Date Jan. 11, 2013.

* cited by examiner

REMOVABLE DOOR WITH HINGE DETENT

FIELD

The present disclosure relates to a vehicle door, and more particularly, to a removable vehicle door with a hinge assembly having a detent.

BACKGROUND

A vehicle can be provided with a roof and doors that a driver or passenger can quickly and easily remove to improve the driver's and/or passenger's enjoyment while driving. Removable doors provide a pleasurable, open-air driving experience. Removable doors may be provided with hinge assemblies that allow the driver and/or passenger to quickly and easily remove the door in a manner that allows the vehicle to be driven without one or more of the doors attached to a body of the vehicle.

SUMMARY

In one form, the present disclosure provides a hinge assembly for a vehicle door that may include first and second hinge portions, a pivot pin, and a retaining member. The first hinge portion may be secured to one of a vehicle body and the vehicle door, and may include a first aperture extending therethrough and a first distal end having a protrusion extending therefrom. The second hinge portion may be secured to another of the vehicle body and the vehicle door, and may include a second aperture extending therethrough and a second distal end having a first detent formed therein. The first detent may engage the protrusion when the vehicle door is in an open position. The pivot pin may selectively engage the first and second apertures to provide relative rotation between the first and second hinge portions. The retaining member may engage an end portion of the pivot pin. The retaining member may slidably engage one of the first and second apertures for relative axial or reciprocating motion therebetween.

In some embodiments, the second hinge portion may include a second detent. The protrusion may engage the second detent when the door is in a closed position.

In some embodiments, the retaining member may include a head portion limiting a range of the relative reciprocating motion between the retaining member and the one of the first and second apertures. In some embodiments, the retaining member may include a socket formed in the head portion of the retaining member.

In some embodiments, the hinge assembly may include a biasing member disposed between the retaining member and a surface of one of the first and second hinge portions and may urge the retaining member away from the surface. The biasing member may be configured to resist engagement and disengagement between the protrusion and first detent and to resist engagement and disengagement between the protrusion and the second detent.

In some embodiments, the second aperture may include a first portion having a first diameter and a second portion having a second diameter.

In some embodiments, the first detent may include a first depth and the second detent may include a second depth that is greater than the first depth. The first hinge portion may be disposed at a first axial position relative to the second hinge portion when the vehicle door is in the open position, and the first hinge portion may be disposed at a second axial position relative to the second hinge portion when the vehicle door is in the closed position.

In some embodiments, an annular elastomeric member may fixedly engage one of the first and second hinge portions and slidably engage the retaining member.

In some embodiments, the pivot pin may include a head portion that is disposed at a first distance from one of the first and second hinge portions when the vehicle door is in the closed position and a second distance from the one of the first and second hinge portions when the vehicle door is in the open position.

In another form, the present disclosure provides a vehicle that may include a body, a door, first and second hinge portions, and a pivot pin. The body may define an interior cabin of the vehicle. The door may be selectively attached to the body and may be movable relative thereto between a closed position and an open position. The door may be selectively removable from the body by a user such that the vehicle is drivable by the user with the door removed from the vehicle. The first hinge portion may be fixed relative to the body and may include a first aperture extending therethrough. The second hinge portion may be fixed relative to the door and may include a second aperture extending therethrough. The pivot pin may pivotably engage the first and second apertures when the door is attached to the body. One of the first and second hinge portions may include a protrusion and the other of the first and second hinge portions may include first and second detents. The protrusion may engage the first detent when the door is in the closed position and may engage the second detent when the door is in the open position.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

When an element or component is referred to as being "on," "engaged to," "connected to," or "coupled to" another element or component, it may be directly on, engaged, connected or coupled to the other element or component, or intervening elements or components may be present. In contrast, when an element or component is referred to as being "directly on," "directly engaged to," "directly connected to," or "directly coupled to" another element or component, there may be no intervening elements or components present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

DETAILED DESCRIPTION

Figure 1:
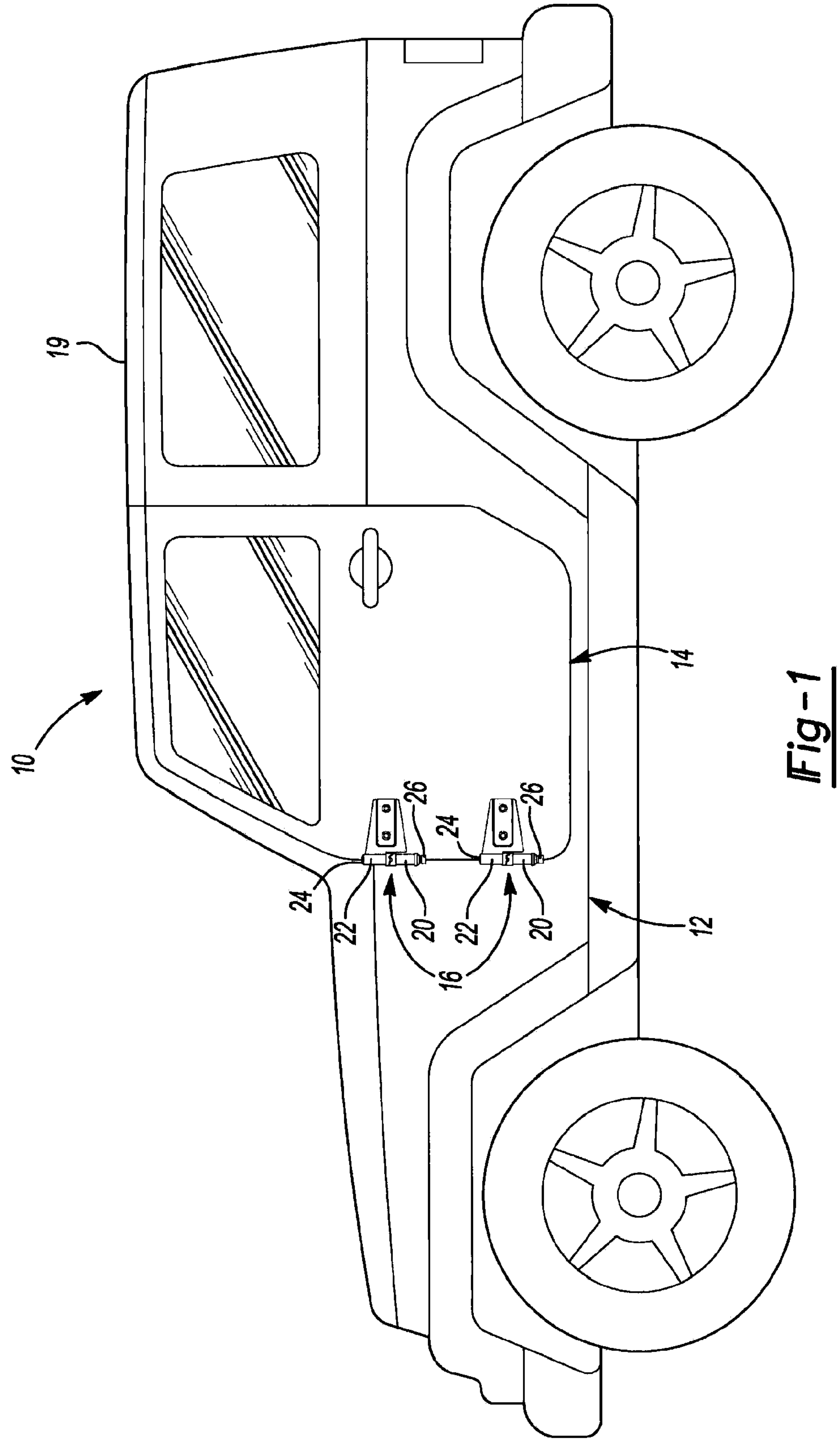
FIG. 1 is a side view of a vehicle having a door and door hinge assemblies in a closed position.

In an exemplary embodiment and with reference to FIGS. 1-7, a vehicle 10 is provided that may include a body 12, one or more doors 14, and one or more door hinge assemblies 16 removably connecting the one or more doors 14 to the body 12. The vehicle 10 may be an automotive vehicle (e.g., a sport-utility-vehicle, a car, a pickup-truck, a van, etc.), a commercial vehicle, an industrial vehicle, a military vehicle, or any other type of vehicle.

The door hinge assemblies 16 allow the door 14 to pivot between a closed position (FIG. 1) and an open position (shown in solid lines in FIG. 2) to allow a user (e.g., a consumer such as a driver or passenger) of the vehicle 10 to enter and exit an interior 18 of the vehicle 10. As will be subsequently described, the door hinge assemblies 16 are configured to retain the door 14 in the open position relative to the body 12. The door hinge assemblies 16 are also configured to allow the user of the vehicle 10 to quickly and easily remove the door 14 from the body 12 of the vehicle 10 using only simple tools such as a wrench and/or a screwdriver, or a pair of wrenches (e.g., one or more of a crescent, socket wrench, a hex key, and a hex wrench) or other simple tools that may be stored within the user's clothing pockets or a center console or glove compartment in the interior 18 of the of the vehicle 10, for example, or any other location of the user's choosing. In this manner, the user may remove one or more doors 14 from the body 12 of the vehicle 10 and drive the vehicle 10 with the doors 14 removed. In some embodiments, the body 12 may include a removable and/or retractable roof 19.

Each of the door hinge assemblies 16 may include a first hinge member 20, a second hinge member 22, a pivot pin 24, a retaining member 26, and a biasing member 28. The first hinge member 20 may be welded or otherwise attached to the body 12 and may include a first body portion 30 and a first bushing 32. The first body portion 30 and the first bushing 32 may be generally cylindrical members that may be substantially axially aligned with each other. The first bushing 32 may extend from an axial end of the first body portion 30. The first bushing 32 and the first body portion 30 may be integrally formed with each other, or the first bushing 32 and the first body portion 30 may be separate components that may be welded and/or threadably secured to each other, for example. In some embodiments, the first bushing 32 and/or the first body portion 30 may be formed from steel and/or nylon, for example, or any other suitable one or more metallic or polymeric materials.

The first hinge member 20 may include a first aperture 34 extending axially through the first body portion 30 and the first bushing 32. The first aperture 34 may include a first portion 36, a second portion 38, and a third portion 40. The second portion 38 may be disposed between the first and third portions 36, 40 and may have a smaller diameter than both of the first and third portions 36, 40. The first, second and third portions 36, 38, 40 may cooperate to form first and second shoulders 42, 44.

Figure 7:
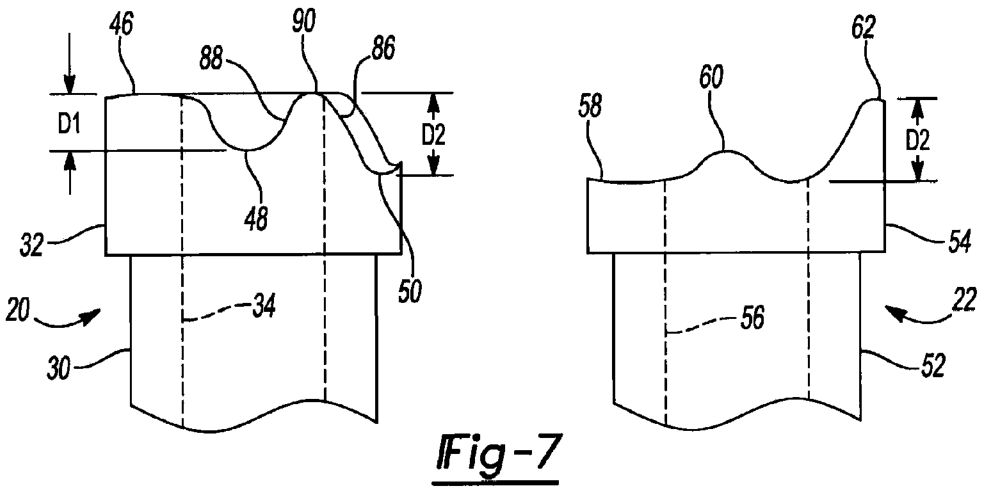
FIG. 7 is a partial side-view of first and second hinge members of the door hinge assembly.

The first bushing 32 may include a distal end 46 having first and second depressions or detents 48, 50 formed therein. As shown in FIG. 7, the first detent 48 may include a first depth D1 from the distal end 46, and the second detent 50 may include a second depth D2 from the distal end 46. The second depth D2 may be greater than the second depth D1.

The second hinge member 22 may be secured to the door 14 and may include a second body portion 52 and a second bushing 54. The second body portion 52 and the second bushing 54 may be generally cylindrical members that may be substantially axially aligned with each other. The second bushing 54 may extend from an axial end of the second body portion 52. The second bushing 54 and the second body portion 52 may be integrally formed with each other, or the second bushing 54 and the second body portion 52 may be separate components that are welded and/or threadably secured to each other, for example. In some embodiments, the second bushing 54 and/or the second body portion 52 may be formed from steel and/or nylon, for example, or any other suitable one or more metallic or polymeric materials.

Figure 3:
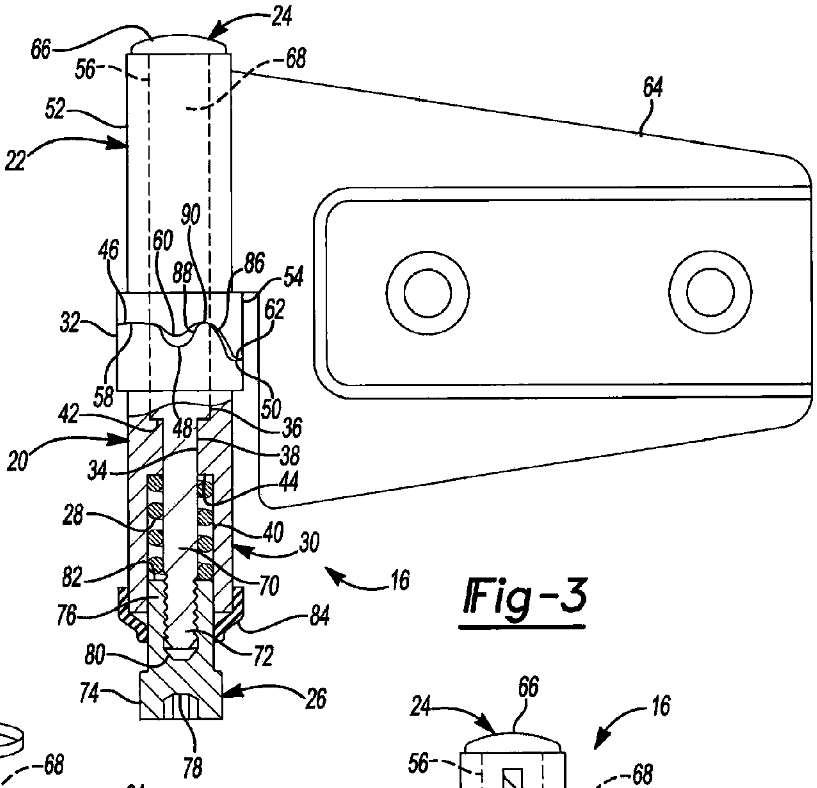
FIG. 3 is a partial cross-sectional view of one of the door hinge assemblies of FIG. 1 in the closed position.
Figure 4:
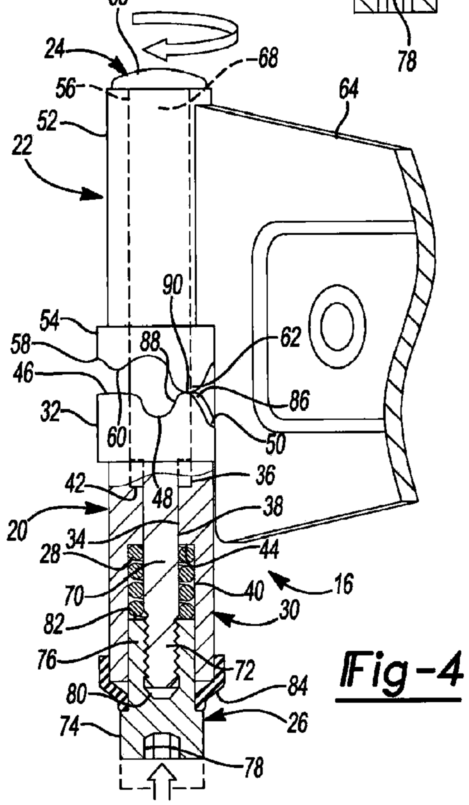
FIG. 4 is a partial cross-sectional view of the door hinge assembly of FIG. 3 in an intermediate position.
Figure 5:
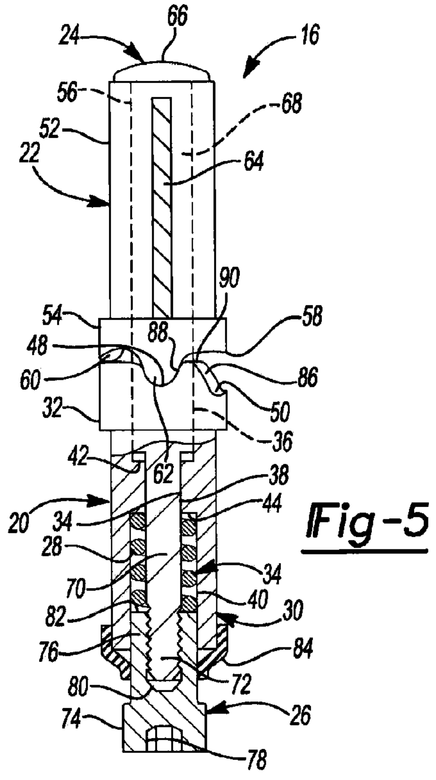
FIG. 5 is a partial cross-sectional view of the door hinge assembly of FIG. 3 in the open position.

The second hinge member 22 may include a second aperture 56 extending axially through the second body portion 52 and the second bushing 54. The second aperture 56 may be substantially axially aligned with the first aperture 34 in the first hinge member 20 when the hinge assembly 16 is in a fully assembled condition, as shown in FIGS. 3-5. The second aperture 56 may include a diameter that is substantially equal to the first portion 36 of the first aperture 34.

The second bushing 54 may include a distal end 58 having first and second protrusions or lobes 60, 62 formed thereon. As shown in FIG. 7, the first and second lobes 60, 62 may be sized and shaped to compliment and fit within the first and second detents 48, 50. In some embodiments, the second lobe 62 may include a height that is equal to or nearly equal to the depth D2 of the second detent 50. In some embodiments, the first lobe 60 may include a height that is substantially equal to a difference between the depth D2 and the depth D1, for example. In other embodiments, the second bushing 54 may include only the second lobe 62. While the first bushing 32 of the first hinge member 20 is described above as including the first and second detents 48, 50 and the second bushing 54 of the second hinge member 22 is described as including the first and second lobes 60, 62, in some embodiments, the first bushing 32 could include the first and second lobes 60, 62, and the second bushing 54 could include the first and second detents 48, 50.

In some embodiments, a flange 64 may be integrally formed with or welded to the second body portion 52 of the second hinge member 22. The flange 64 may be welded and/or bolted or riveted to an outer panel of the door 14 to fix the second hinge member 22 relative to the door 14. In some embodiments, the second body portion 52 may be welded or otherwise fixed directly to the door 14.

The pivot pin 24 may be received in the first and second apertures 34, 56 of the first and second hinge members 20, 22, respectively, and may include a head portion 66, a first shaft portion 68, and a second shaft portion 70. In some embodiments, the head portion 66 may include flat surfaces (e.g., a hex-head) to allow the user to grip the head portion 66 with a wrench or pliers, for example, or with his or her fingers. In some embodiments, the head portion 66 may include a slot, socket or other feature in which a screwdriver or other tool may be received.

The first shaft portion 68 may be disposed between the head portion 66 and the second shaft portion 70 and may include a diameter that is larger than a diameter of the second shaft portion 70 but smaller than a diameter or width of the head portion 66. The second shaft portion 70 may include a threaded portion 72 that may threadably engage the retaining member 26.

The first shaft portion 68 may slidably engage the second aperture 56 and the first portion 36 of the first aperture 34. The second shaft portion 70 may slidably engage the second portion 38 of the first aperture 34. In this manner, the pivot pin 24 may pivot and move axially or reciprocate within the first and second apertures 34, 56 relative to the first and/or second hinge members 20, 22. This allows the second hinge member 22 to pivot about a longitudinal axis of the pivot pin 24 relative to the first hinge member 20. The axial and pivotal motion of the pivot pin 24 may also allow the second hinge member 22 to move in a direction parallel to the longitudinal axis relative to the first hinge member 20.

The retaining member 26 may be a generally cylindrical member and may include a head portion 74 and a shaft portion 76. The head portion 74 could include a rounded periphery or a hexagonal periphery, for example. In some embodiments, a hexagonal socket 78 or a slot may be formed in the head portion 74 to receive a hex key or a screwdriver, for example. The shaft portion 76 may include a threaded aperture 80 that threadably engages the threaded portion 72 of the pivot pin 24. In this manner, the user may selectively secure and detach the retaining member 26 from the pivot pin 24.

The shaft portion 76 of the retaining member 26 may be slidably received in the third portion 40 of the first aperture 34 of the first hinge member 20. The biasing member 28 may be disposed between an end 82 of the shaft portion 76 and the second shoulder 44 in the first body portion 30 of the first hinge member 20. The biasing member 28 may be a helical compression spring, for example, and may bias the retaining member 26, and thus the second shaft portion 70 of the pivot pin 24, away from the second hinge member 22. The head portion 74 may include a diameter that is larger than the diameter of the third portion 40 of the first aperture 34 to limit a range of axial motion of the retaining member 26, pivot pin 24 and second hinge member 22 relative to the first hinge member 20.

In some embodiments, an annular, elastomeric boot or a sleeve 84 may be fixed to the first body portion 30 of the first hinge member 20 and may slidably engage the shaft portion 76 of the retaining member 26. The sleeve 84 may restrict or prevent dirt, debris and/or moisture from entering the first aperture 34 in the first hinge member 20.

With continued reference to FIGS. 1-7, operation of the hinge assemblies 16 and door 14 will be described in detail. As described above, the door hinge assemblies 16 are configured to pivot the door 14 between the open and closed positions and selectively retain the door 14 in the open and closed positions relative to the body 12. The door hinge assemblies 16 are also configured to allow the user of the vehicle 10 to quickly and easily disassemble the hinge assemblies 16 and remove the door 14 from the body 12 of the vehicle 10 using only one or more simple tools.

When the door 14 and the hinge assemblies 16 are in the closed position (FIGS. 1 and 3), the first and second lobes 60, 62 of the second hinge member 22 may be received in or seated in the first and second detents 48, 50, respectively. As the door 14 moves from the closed position to the open position, the second hinge member 22 rotates relative to the first hinge member 20, as shown in FIG. 4. Rotation in this direction may cause the second lobe 62 to slide along a sloped surface 86 of the second detent 50 toward the first detent 48. As the second lobe 62 slides along the sloped surface 86, the second hinge member 22, the pivot pin 24 and retaining member 26 may move axially upward (relative to the views shown in FIGS. 3-5) relative to the first hinge member 20 and compress the biasing member 28, as shown in FIG. 4. The biasing member 28 urges the second hinge member 22 back toward the closed position while the second lobe 62 is in sliding contact with the sloped surface 86.

Further rotation of the door 14 toward the open position may cause the second lobe 62 to slide across a peak 90 between the first and second detents 48, 50 and slide along a sloped surface 88 of the first detent 48. Once the second lobe 62 slides across the peak 90 and onto the sloped surface 88, the biasing force of the biasing member 28 may urge the retaining member 26, pivot pin 24 and second hinge member 22 axially downward (relative to the views shown in FIGS. 3-5) and toward the open position. The downward biasing force of the biasing member 28 coupled with the shape of the sloped surface 88 may rotationally urge the second lobe 62 into engagement with the first detent 48. When the second lobe 62 is fully engaged in the first detent 48 (i.e., in the open position shown in FIG. 5), the first lobe 60 may be in contact with the end 46 of the first busing 32 to provide stability and support for the weight of the door 14 and the second hinge member 22.

Because moving the second hinge member 22 in either rotational direction from the open position (i.e., such that the second lobe 62 disengages the first detent 48) includes upward movement of the second hinge member 22 relative to the first hinge member 20 against the biasing force of the biasing member 28, the generally U-shape of the first detent 48 and the biasing force of the biasing member 28 cooperate to retain the second hinge member 22 and the door 14 in the open position. Moving the second hinge member 22 out of the open position would require a sufficiently strong rotational force to overcome the force of the biasing member 28.

Figure 6:
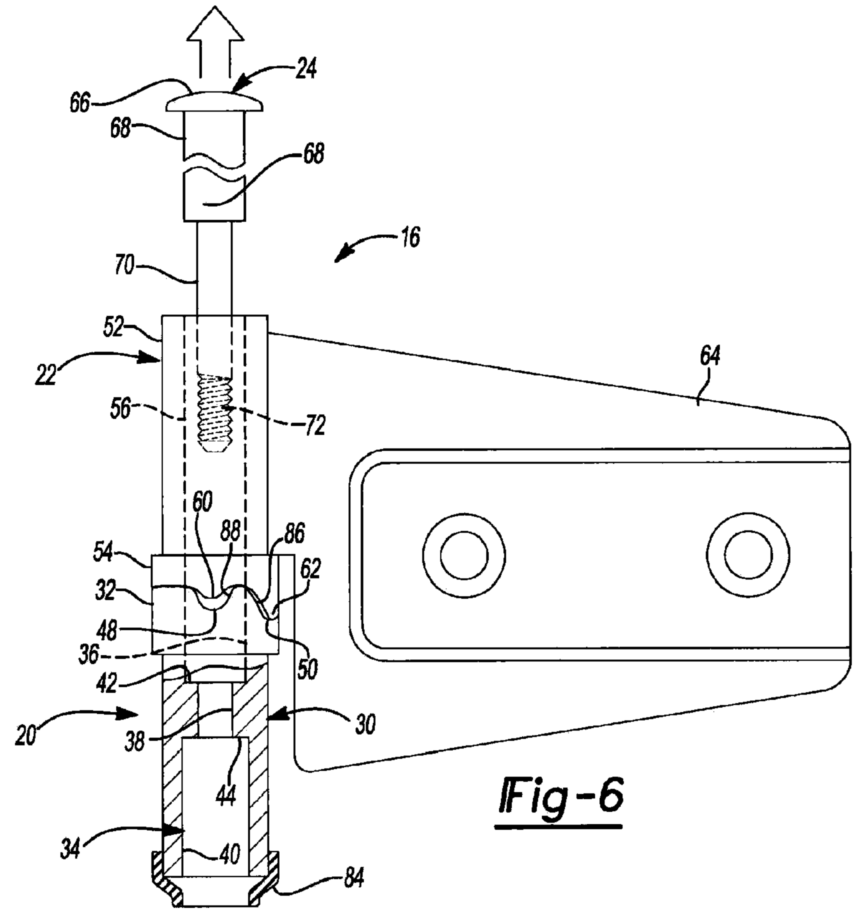
FIG. 6 is a partial cross-sectional view of the door hinge assembly in a partially disassembled condition.

In the manner described above, interaction between the first and second bushings 32, 54 allows the hinge assemblies 16 to retain the door 14 in the open and closed positions. When the door 14 and hinge assemblies 16 are in the open or closed positions or any position therebetween, the user may quickly and easily disassembly the hinge assemblies 16 and remove the door 14 from the body 12 of the vehicle 10. The user may first disengage the retaining member 26 from the pivot pin 24 by unscrewing the retaining member 26 from the threaded portion 72 using one or more simple tools (e.g., a wrench, screwdriver, hex key, etc.). Once the retaining member 26 is disengaged from the pivot pin 24, the retaining member 26 and the biasing member 28 may be removed from the first aperture 34 in the first hinge member 20. The user may slide the pivot pin 24 upward, as shown in FIG. 6, to remove the pivot pin 24 from the first and second apertures 34, 56 of the first and second hinge members 20, 22, respectively. With the pivot pin 24 removed, the door 14 and the second hinge member 22 can be lifted off of the first hinge member 20 and removed from the vehicle (as shown in phantom lines in FIG. 2).

The user can install the door 14 back onto the body 12 of the vehicle 10 by aligning the second hinge member 22 relative to the first hinge member 20 such that the first and second apertures 34, 56 are substantially axially aligned with each other. The pivot pin 24 can then be inserted down through the second aperture 56 and into the first aperture 34. The user may then insert the biasing member 28 into the third portion 40 of the first aperture 34 such that the biasing member 28 is disposed around an outer periphery of the second shaft portion 70 of the pivot pin 24. The retaining member 26 may then be inserted into the third portion 40 of the first aperture 34 and threadably engaged with the pivot pin 24. As described above, when the retaining member 26 is fully engaged with the threaded portion 72 of the pivot pin 24, the biasing member 28 may abut the second shoulder 44 the end 82 of the retaining member 26.

Figure 2:
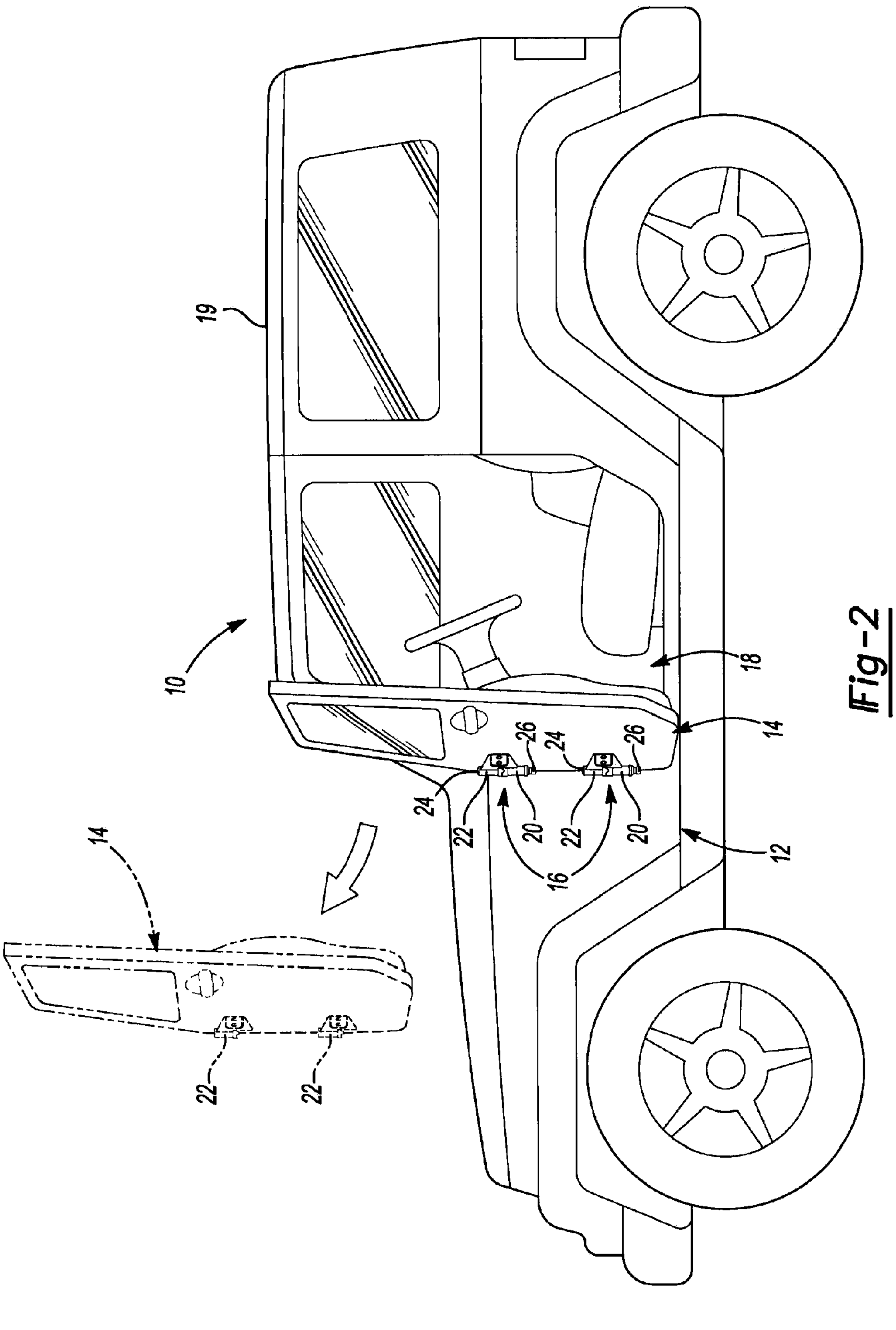
FIG. 2 is a side view of the vehicle of FIG. 1 with the door and door hinge assemblies in an open position.

While FIGS. 1 and 2 depict the door 14 being rotatably secured to the body 12 by a pair of hinge assemblies 16, in some embodiments, each door 14 may include only one hinge assembly 16 or more than two hinge assemblies 16. In some embodiments, the first and second lobes 60, 62 may be formed in the first bushing 32 and the first and second detents 48, 50 may be formed in the second bushing 54. In some embodiments, the first hinge member 20 may be secured to the door 14 and the second hinge member 22 may be secured to the body 12. In some embodiments, one or more of the hinge assemblies 16 may be attached to a tailgate and/or a pivotable rear window, for example, to provide for pivotal movement of the tailgate and/or window relative to the body 12 and/or for selective removal of the tailgate and/or window.

What is claimed is:

1. A hinge assembly for a vehicle door comprising:

a first hinge portion secured to one of a vehicle body and the vehicle door, the first hinge portion including a first aperture extending therethrough and a first distal end having a protrusion extending therefrom;

a second hinge portion secured to another of the vehicle body and the vehicle door, the second hinge portion including a second aperture extending therethrough and a second distal end having a first detent formed therein;

a pivot pin selectively engaging the first and second apertures to provide relative rotation between the first and second hinge portions between open and closed positions, the protrusion engaging the first detent in the open position and disengaged with the first detent in the closed position; and a retaining member engaging an end portion of the pivot pin, the retaining member slidably engaging one of the first and second apertures such that the retaining member moves axially relative to the one of the first and second apertures as the vehicle door moves between the open position and a closed position.

2. The hinge assembly of claim 1, wherein the second hinge portion includes a second detent formed therein, the second detent engaging the protrusion when the closed position.

3. The hinge assembly of claim 2, wherein the first detent includes a first depth and the second detent includes a second depth that is greater than the first depth.

4. The hinge assembly of claim 3, wherein the first hinge portion is disposed at a first axial position relative to the second hinge portion in the open position, and the first hinge portion is disposed at a second axial position relative to the second hinge portion in the closed position.

5. The hinge assembly of claim 1, wherein the retaining member includes a head portion limiting a range of the relative axial motion between the retaining member and the one of the first and second apertures.

6. The hinge assembly of claim 5, wherein the retaining member includes a socket formed in the head portion of the retaining member.

7. The hinge assembly of claim 2, further comprising a biasing member disposed between the retaining member and a surface of one of the first and second hinge portions and urging the retaining member away from the surface.

8. The hinge assembly of claim 7, wherein the biasing member is configured to resist engagement and disengagement between the protrusion and first detent and to resist engagement and disengagement between the protrusion and the second detent.

9. The hinge assembly of claim 7, wherein the second aperture includes a first portion having a first diameter and a second portion having a second diameter.

10. A hinge assembly for a vehicle door comprising:

a first hinge portion secured to one of a vehicle body and the vehicle door, the first hinge portion including a first aperture extending therethrough and a first distal end having a protrusion extending therefrom;

a second hinge portion secured to another of the vehicle body and the vehicle door, the second hinge portion including a second aperture extending therethrough and a second distal end having a first detent formed therein;

a pivot pin selectively engaging the first and second apertures to provide relative rotation between the first and second hinge portions between open and closed positions, the protrusion engaging the first detent in the open position and disengaged with the first detent in the closed position; and a retaining member engaging an end portion of the pivot pin, the retaining member slidably engaging one of the first and second apertures for relative axial motion therebetween, wherein the pivot pin includes a head portion that is disposed at a first distance from one of the first and second hinge portions when the vehicle door is in the closed position and a second distance from the one of the first and second hinge portions when the vehicle door is in the open position.

11. A vehicle comprising:

a body defining an interior of the vehicle;

a door selectively attached to the body and movable relative thereto between a closed position and an open position, the door being selectively removable from the body by a user such that the vehicle is drivable by the user with the door removed from the vehicle;

a first hinge portion fixed relative to the body and including a first aperture extending therethrough;

a second hinge portion fixed relative to the door and including a second aperture extending therethrough; and a pivot pin pivotably engaging the first and second apertures when the door is attached to the body, wherein one of the first and second hinge portions includes a protrusion and the other of the first and second hinge portions includes first and second detents, the protrusion engaging the first detent when the door is in the closed position and engaging the second detent when the door is in the open position, and wherein the first hinge portion is movable relative to the second hinge portion along a longitudinal axis of the pivot pin as the door moves between the open and closed positions.

12. The vehicle of claim 11, further comprising a retaining member removably secured to the pivot pin and slidably engaging one of the first and second apertures for relative axial motion therebetween.

13. The vehicle of claim 12, wherein the retaining member includes a head portion limiting a range of the relative axial motion between the retaining member and the one of the first and second apertures.

14. The vehicle of claim 12, wherein the retaining member includes a socket formed in the head portion of the retaining member.

15. The vehicle of claim 12, further comprising an annular elastomeric member fixedly engaging one of the first and second hinge portions and slidably engaging the retaining member.

16. The vehicle of claim 12, further comprising a biasing member disposed between the retaining member and a surface of one of the first and second hinge portions and urging the retaining member away from the portion.

17. The vehicle of claim 16, wherein the biasing member is configured to resist engagement and disengagement between the protrusion and first detent and to resist engagement and disengagement between the protrusion and the second detent.

18. The vehicle of claim 16, wherein the second aperture includes a first portion having a first diameter and a second portion having a second diameter.

19. The vehicle of claim 11, wherein the first detent includes a first depth and the second detent includes a second depth that is greater than the first depth.

20. The hinge assembly of claim 1, wherein the protrusion partially defines a periphery of the first aperture.

* * * * *